United States Patent
Memory et al.

[11] Patent Number: 6,148,863
[45] Date of Patent: Nov. 21, 2000

[54] MULTI-COMPARTMENT TANK FOR AGRICULTURAL IMPLEMENT

[75] Inventors: Russell J. Memory; Montgomerie B. Summach; Cameron D. Bodie, all of Saskatoon, Canada

[73] Assignee: Flexi-Coil Ltd., Saskatoon, Canada

[21] Appl. No.: 09/414,517

[22] Filed: Oct. 8, 1999

Related U.S. Application Data

[63] Continuation of application No. 08/904,586, Aug. 1, 1997, abandoned.

[51] Int. Cl.$^7$ .................................................. A01G 25/09
[52] U.S. Cl. .......................... 137/899; 137/262; 137/267; 137/343; 222/143
[58] Field of Search .................................. 137/899, 255, 137/262, 266, 267, 343; 222/143

[56] References Cited

U.S. PATENT DOCUMENTS

| | | | |
|---|---|---|---|
| 2,539,663 | 1/1951 | Hague | 137/267 |
| 3,908,718 | 9/1975 | Bower | 141/59 |
| 4,541,549 | 9/1985 | Hadley et al. | 222/143 |
| 4,715,515 | 12/1987 | Steilen | 222/143 |
| 5,267,792 | 12/1993 | Schlake | 366/293 |
| 5,285,811 | 2/1994 | DiLuigi et al. | 137/347 |

*Primary Examiner*—A. Michael Chambers
*Assistant Examiner*—Thomas L. McShane
*Attorney, Agent, or Firm*—Larry W. Miller; J. William Stader

[57] ABSTRACT

A multi-compartment tank structure for an agricultural air cart is formed in a modular configuration with two, three or more containers operable to carry different supplies of materials to the field. Each container is formed with an interlocking mating wall structure having a pair of spaced apart geodesic-like lobes separated by a curved key portion recessed with respect to the lobes. One container having a convex mating wall configuration interfits with another container having a complementary concave mating wall structure. In the three or more compartment configuration, the interior container is provided with both convex and concave opposing mating walls to cooperate with the adjacent containers. The lobes are formed from a number of planar surface segments to create the geodesic-like appearance. The bends and angles of the lobes coupled with the recessed curved key portion creating a rib provides adequate strength to resist bucking forces even when only one of the containers is utilized with material stored therein. A ladder is provided adjacent the concave key portions on the interior of the container to provide yet greater resistance to buckling for the concave mating walls.

20 Claims, 7 Drawing Sheets

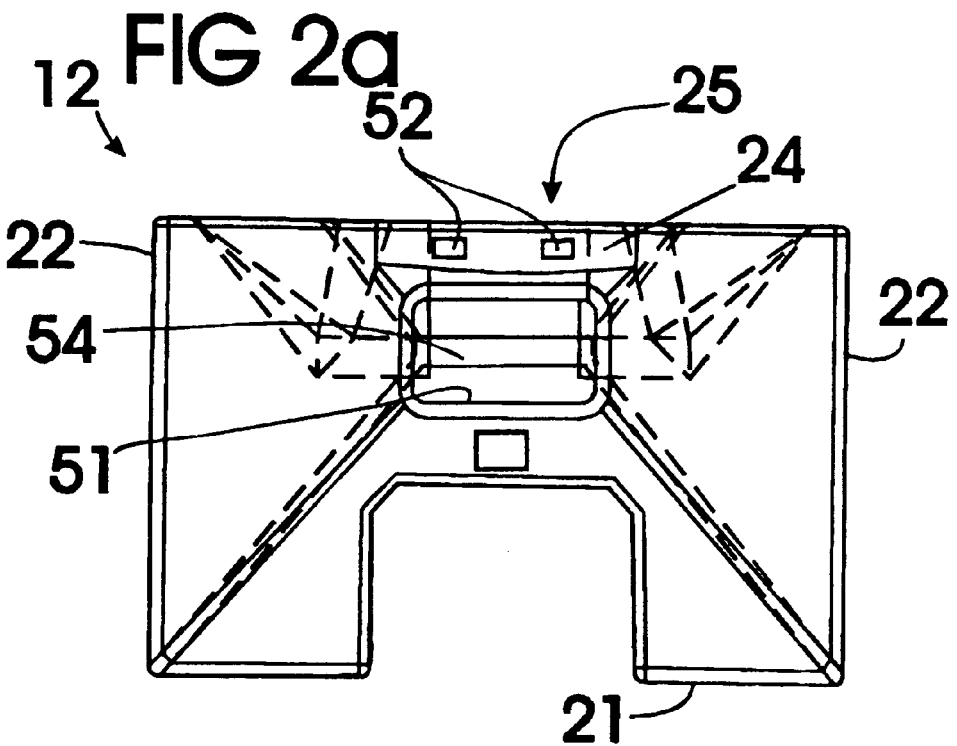
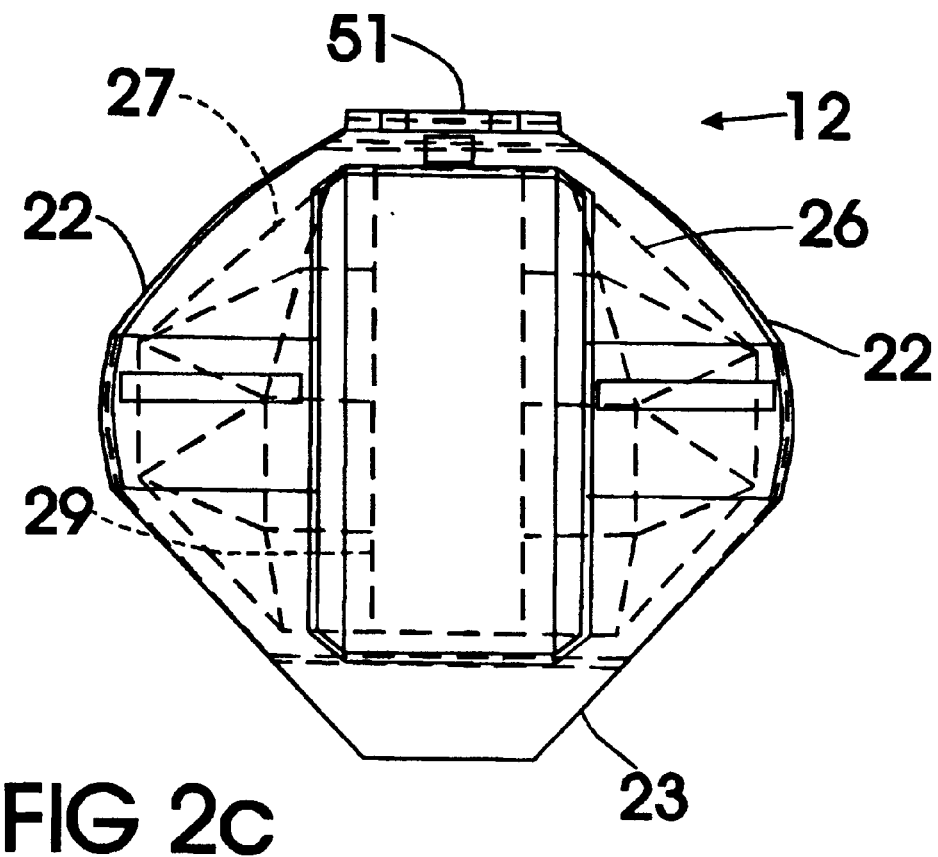

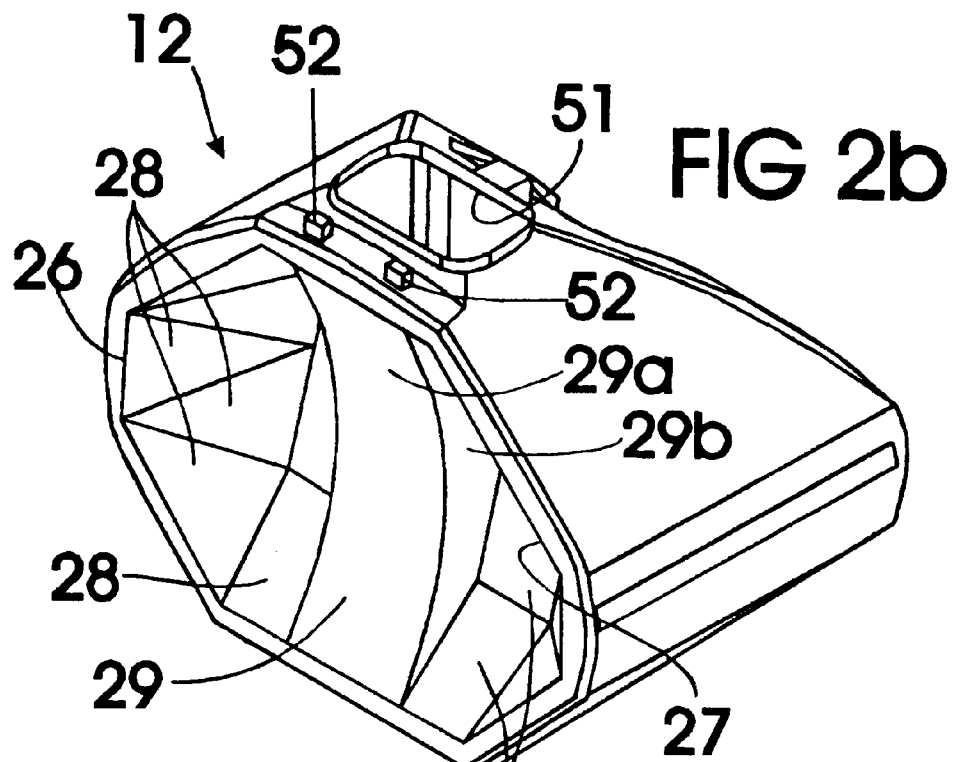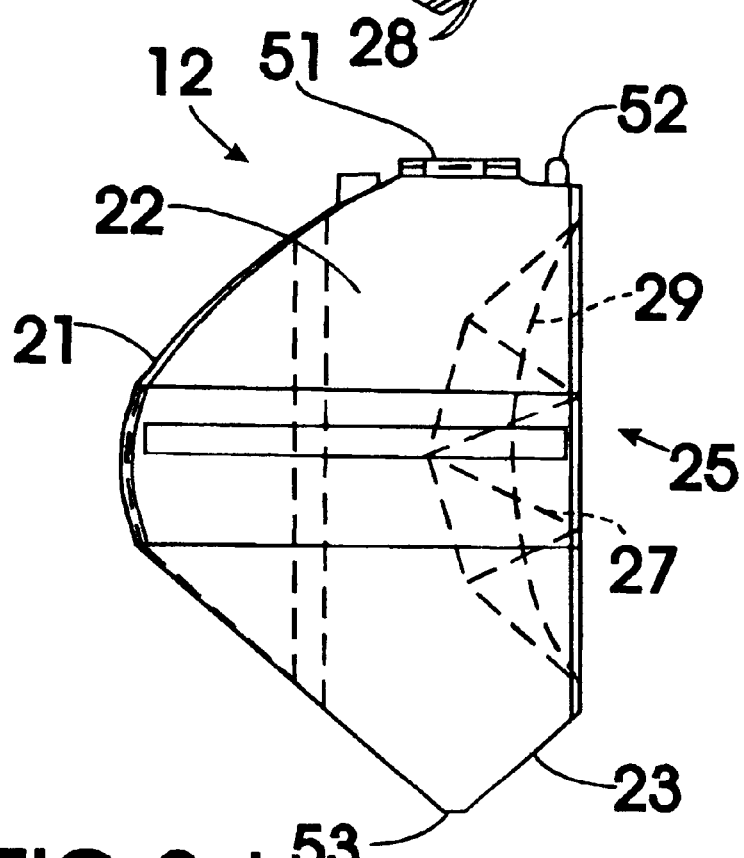

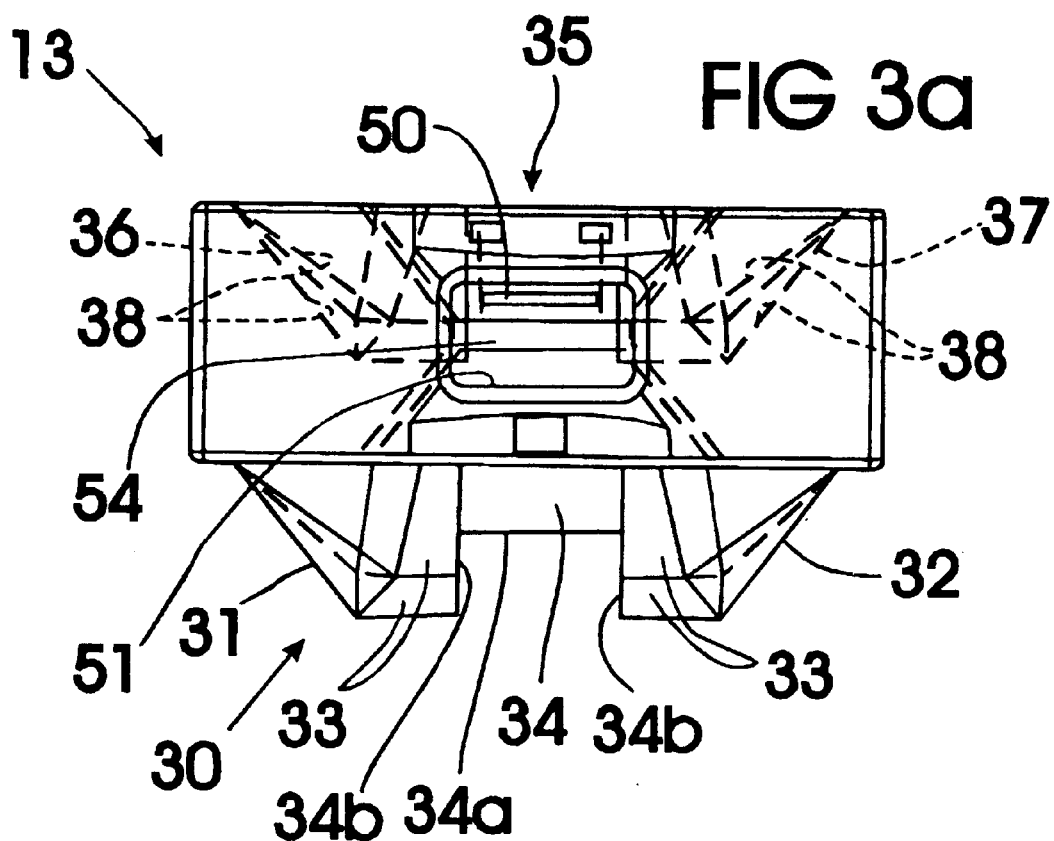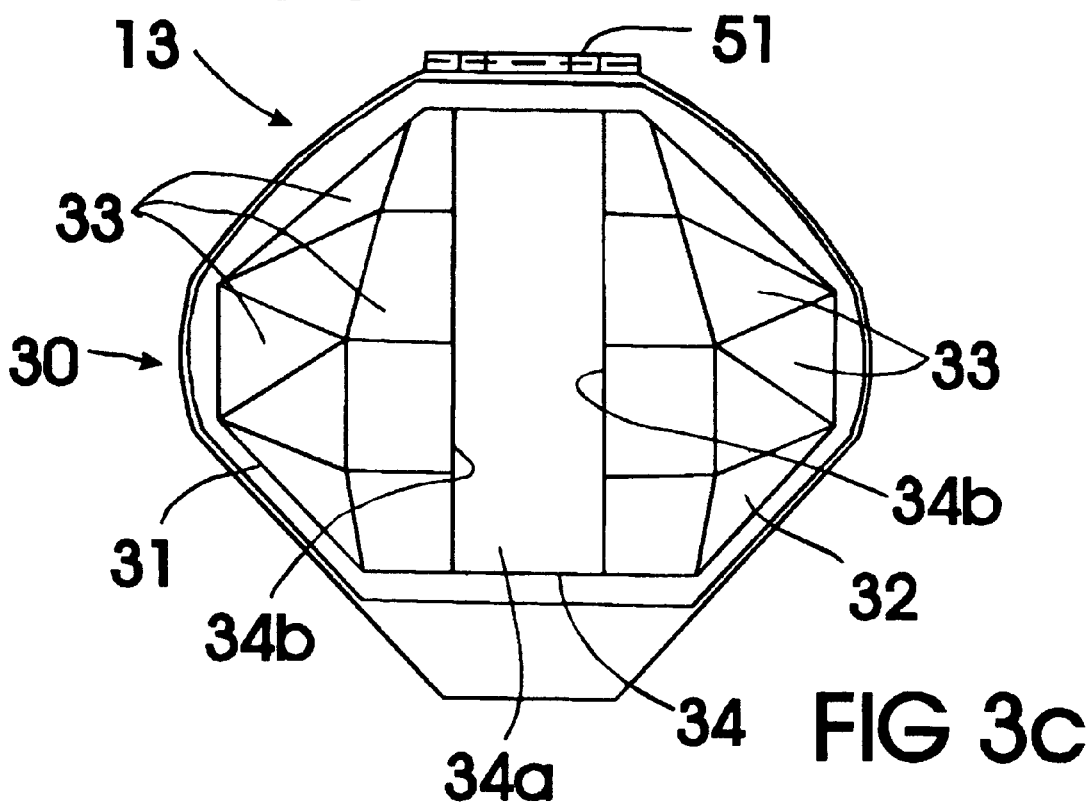

MULTI-COMPARTMENT TANK FOR AGRICULTURAL IMPLEMENT

CROSS-REFERENCE TO RELATED APPLICATIONS

This application is a continuation of U.S. patent application Ser. No. 08/904,586, filed on Aug. 1, 1997, now abandoned, the contents of which are incorporated herein by reference.

BACKGROUND OF THE INVENTION

This invention relates generally to an agricultural implement, such as an air cart forming part of an air seeding implement for planting seed and fertilizer into the ground, and, more particularly, relates to an interlocking tank compartment structure to hold materials, including fertilizers, seed and herbicides for disposition to the ground.

Air carts for use on agricultural implements are well known Typically, these air carts are used as part of an air seeder in which seeds, fertilizer and herbicides are deposited onto and into the ground during the planting operation. The air carts can be in either two container or three container configuration. Typically, the two container configuration is used to carry a supply of seeds and fertilizer for planting into the ground. The three container configuration can be used to carry an additional element, such as a herbicide, to be deposited on the ground. The three container configuration, however, can also be used to carry only one or two materials in whatever amounts are desired.

Interlocking or nesting the containers through a domed structure that protrudes from one container into a mating impression formed into the body of a second container is known in the art, as demonstrated in U.S. Pat. No. 4,541,549, issued on Sep. 17, 1985. Such domed interlocking structure suffers from an inability to withstand pressures and loads generated from the filing and/or pressurizing of only one of the two tanks. Under such circumstances, the domed structure is known to buckle and, thereby, fail to perform the intended function.

Accordingly, it would be desirable to provide a molded plastic tank structure for an agricultural hopper on an air cart that would be operable under a greater range of uses, including the filling and pressurizing of only one container in the tank structure.

SUMMARY OF THE INVENTION

It is an object of the instant invention to provide an interlocking compartmentalized tank structure for an agricultural implement.

It is still another object of this invention to provide a modular multi-container configuration for the tank on an agricultural air cart in which any one of the containers can be used to the exclusion of the other containers.

It is a feature of this invention that the individual containers are molded from noncorrosive plastic.

It is an advantage of this invention that the nesting, interlocking structure is formed with sufficient strength and rigidity that the pressures and loads exerted from the utilization of a single container will not buckle the structure of the container.

It is another feature of this invention that the nesting structure of each container is formed with a central rib that adds bends and angles that increase rigidity of the structure.

It is still another feature of this invention that the nesting structure of each container is formed with a geodesic-like lobe located on each lateral side of the central rib.

It is still another feature of this invention that the geodesic-like lobes are each formed from a plurality of planar surface segments.

It is still another feature of this invention that the central rib is formed as with a generally vertically curved mating surface.

It is yet another feature of this invention that the central rib is recessed relative to the lobes to either side thereof to present a strengthening wall for each of the lobes.

It is another advantage that the geodesic-like lobes and central rib provide many bends and angles to increase the rigidity of the nesting structure beyond that known in the prior art.

It is yet another object of this invention to provide a multi-purpose ladder structure within each container to increase the strength of the nesting structure.

It is yet another feature of this invention that the ladder is mounted to the central rib portion of the nesting structure.

It is still another advantage that one or more of the vertical members of the ladder can be used as a conduit to vent and/or pressurize the container.

It is yet another advantage of this invention that the ladder is oriented between the lobes to resist buckling of the nesting structure.

It is yet another object of this invention to provide an interlocking container configuration for a three or more container tank structure.

It is a further feature of this invention that the center-positioned container is formed with a concave nesting structure on one side and a convex nesting structure on the opposing side to mate with both corresponding end containers.

It is still a further object of this invention to provide a multi-compartment tank for an agricuitural sprayer which is durable in construction, inexpensive of manufacture, care-free of maintenance, facile in assemblage, and simple and effective in use.

These and other objects, features and advantages can be accomplished according to the instant invention by a multi-compartment tank structure for an agricultural air cart that is formed in a modular configuration with two, three or more containers operable to carry different supplies of materials to the field. Each container is formed with an interlocking mating wall structure having a pair of spaced apart geodesic-like lobes separated by a curved key portion recessed with respect to the lobes. One container having a convex mating wall configuration interfits with another container having a complementary concave mating wall structure. In the three or more compartment configuration, the interior container is provided with both convex and concave opposing mating walls to cooperate with the adjacent containers. The lobes are formed from a number of planar surface segments to create the geodesic-like appearance. The bends and angles of the lobes coupled with the recessed curved key portion creating a rib provides adequate strength to resist buckling forces even when only one of the containers is utilized with material stored therein. A ladder is provided adjacent the concave key portions on the interior of the container to provide yet greater resistance to buckling for the concave mating walls.

BRIEF DESCRIPTION OF THE DRAWINGS

The advantages of this invention will be apparent upon consideration of the following detailed disclosure of the invention, especially when taken in conjunction with the accompanying drawings wherein:

FIG. 2a is a top plan view of a first end container having an interior concave mating wall shown in dotted lines;

FIG. 2b is a perspective view of the first end container depicting the interior concave mating wall;

FIG. 2c is an end elevational view of the first end container depicting the outer end of the container, the interior concave mating wall being shown in dotted lines;

FIG. 2d is a side elevational view of the first end container with the interior concave mating wall being shown in dotted lines;

FIG. 3a is a top plan view of an interior container having both a concave mating wall shown in dotted lines and a convex mating wall;

FIG. 3c is an elevational view of the convex side of the interior container;

DETAILED DESCRIPTION OF THE PREFERRED EMBODIMENT

Figure 1:
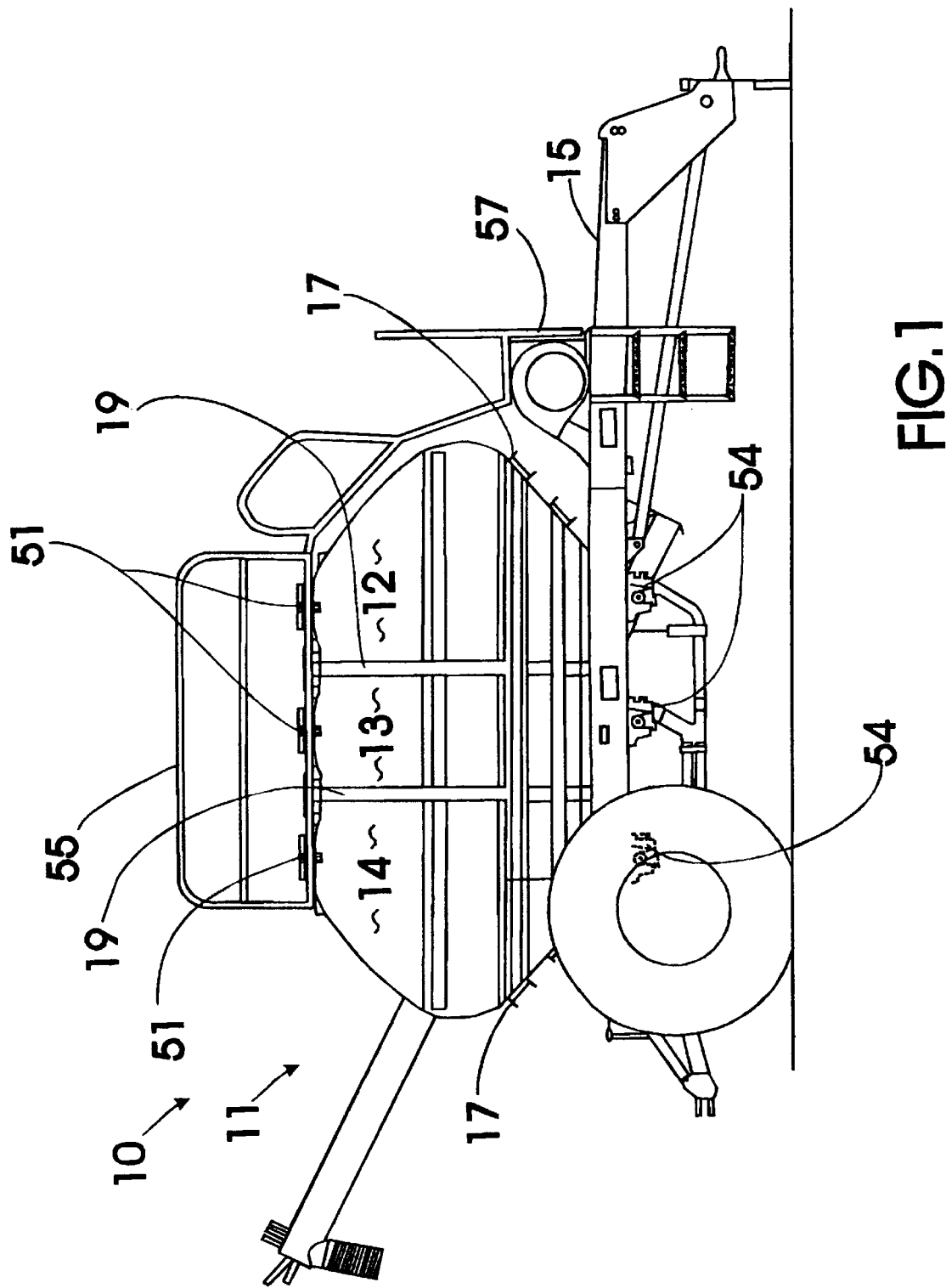
FIG. 1 is a side elevational view of a three container air cart tank incorporating the principles of the instant invention.
Figure 3B:
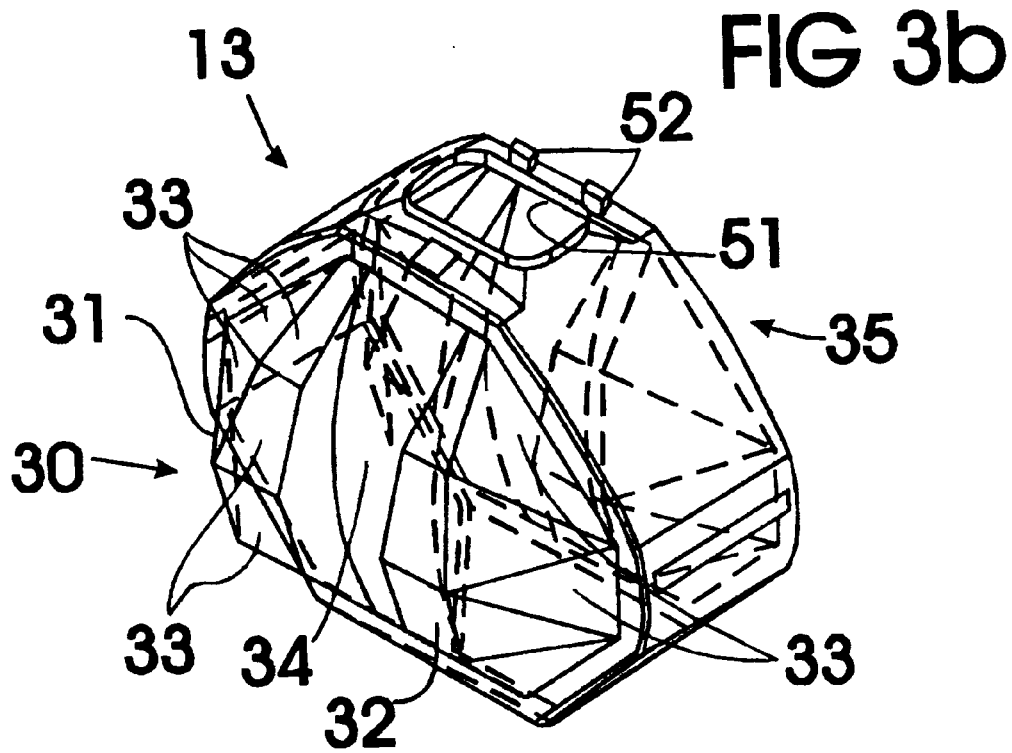
FIG. 3b is a perspective view of the interior container showing the convex mating wall, the concave mating wall being shown in dotted lines.
Figure 3D:
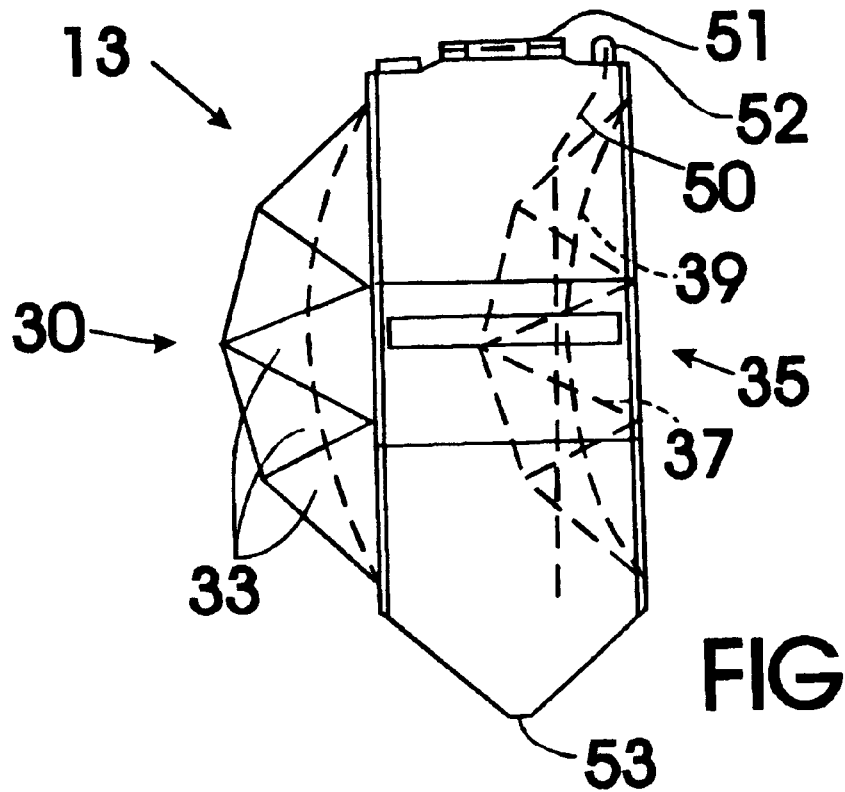
FIG. 3d is a side elevational view of the interior container with the concave mating wall being shown in dotted lines and an interior ladder being depicted in phantom.
Figure 4A:
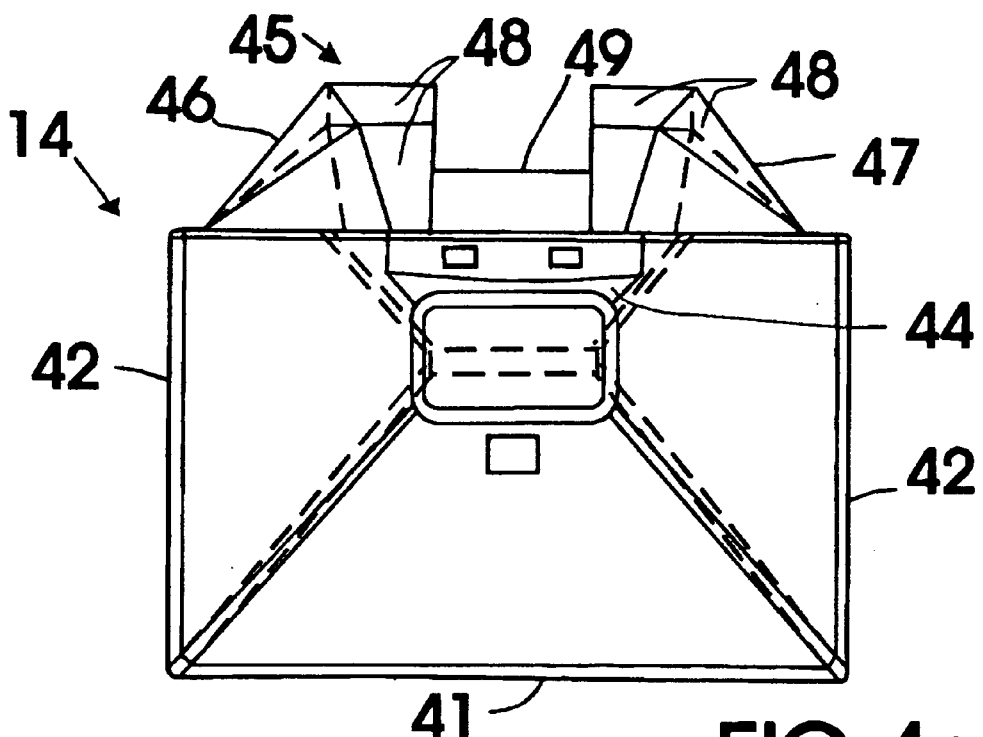
FIG. 4a is a top plan view of a second end container having an interior convex mating wall.
Figure 4C:
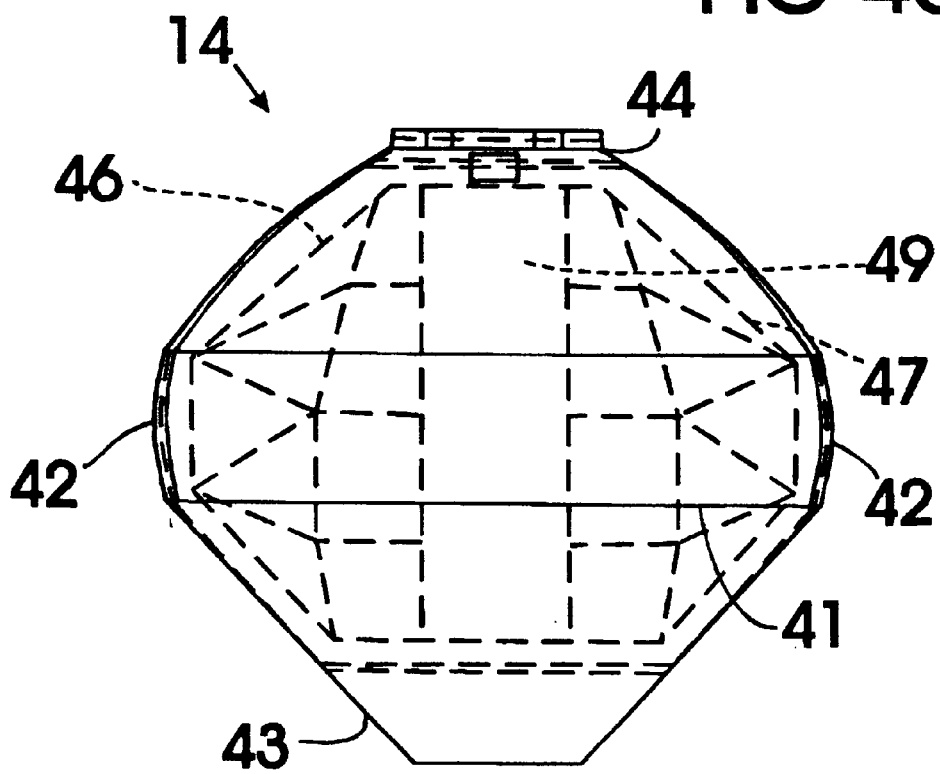
FIG. 4c is an end elevational view of the second end container depicting the outer end of the container, the interior convex mating wall being shown in dotted lines.
Figure 4B:
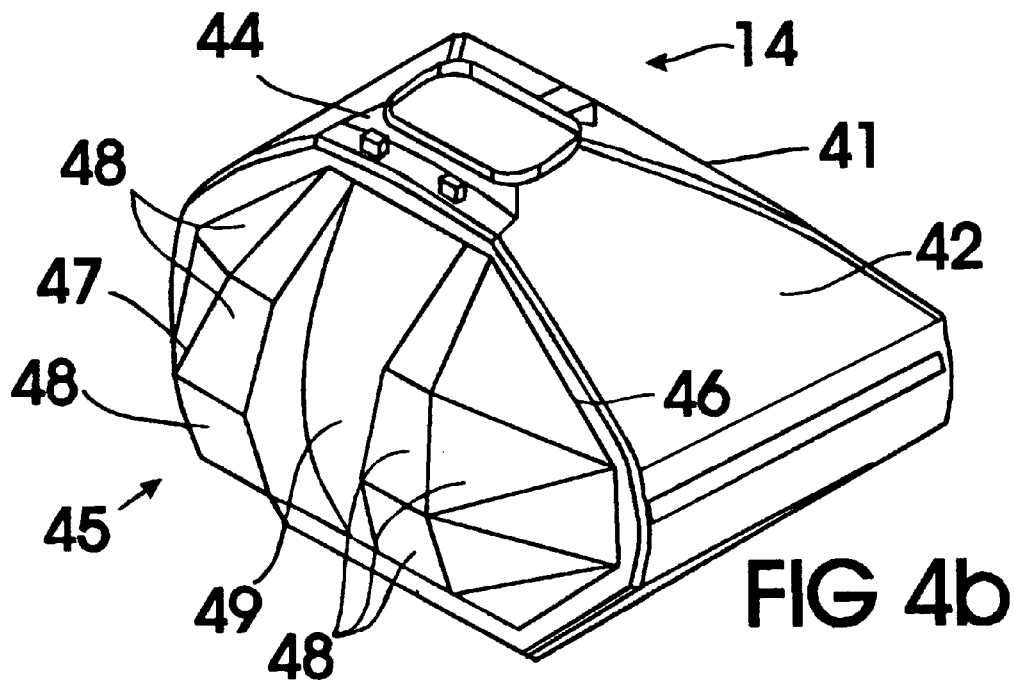
FIG. 4b is a perspective view of the second end container showing the interior convex mating wall.
Figure 4D:
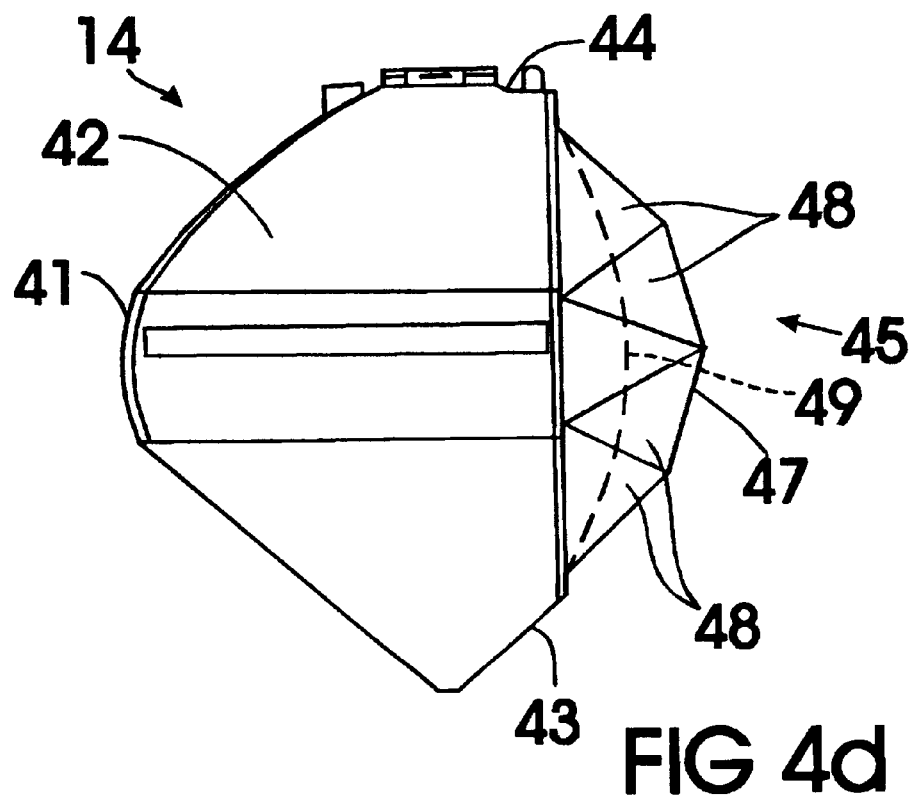
FIG. 4d is a side elevational view of the second end container.

Referring now to FIG. 1, an air cart 10, having a tank 11 of a three container configuration incorporating the principles of the instant invention, can best be seen. The individual containers 12–14 are mounted on a frame mechanism 15 which forms a cradle 17 to support the nested containers 12–14. Vertical support straps 19 extend around the tank 11 at the joints between the individual containers 12–14 to seal the joint therebetween to keep dirt and other unwanted material from becoming wedged between the containers 12–14. The vertical support straps 19 also serve to secure the tank 11 to the cradle 17. The containers 12–14 are preferably formed from molded plastic and are capable of being pressurized. Preferably, each container 12–14 is capable of being pressurized at a different operating pressure from each of the other containers 12–14. Furthermore, each container 12–14 must be capable of operating under different levels of fullness. For example, fertilizer in one container and seed in another container will not necessarily empty at the same rate, particularly for different types of seeds that can be planted.

One skilled in the art will recognize that the tank 11 could be configured in a two container configuration, deleting the interior container 13, as will be described in greater detail below. A two container configured tank 11 will preferably have the containers 12, 14 sized in a 60/40 ratio, with one of the two end containers 12, 14 being larger than the other. One skilled in the art will readily recognize that other ratios may be desirable, particularly in custom uses in which the tank 11 is configured primarily for a specialized crop. The configuration of the tank 11 in the three container configuration, however, adds yet greater flexibility to the ratios that can be derived. The addition of the interior container 13 allows, of course, the tank 11 to carry a third material, such as a herbicide to be added to the ground; however, the addition of the third container 13 also allows a different ratio of two materials to be carried. For example, the interior container could be used to carry an additional supply of either seed or fertilizer to compliment the corresponding supply in one of the end containers 12, 14.

Referring now to FIGS. 2a through 2d, the details of the first end container 12 can best be seen. The first end container 12 is formed with an exterior end wall 21, a pair of opposing exterior side walls 22, a bottom portion 23, and a top portion 24, all formed, preferably, from integrally molded plastic or like material. Opposite the exterior end wall 21 is an interior concave mating wall 25 formed of two geodesic lobes 26, 27 separated by a curved key member 29. The curved key member 29 does not extend into the interior of the container 12 as deeply as the opposing lobes 26, 27 and, as a result, has a distinct curved mating surface 29a and side portions 29b that form the sides of the adjacent lobes 26, 27. The geodesic lobes 26, 27 are formed with a plurality of planar surface segments 28 arranged in a generally vertically curved orientation.

The top portion 24 is provided with a hatch opening 51 through which material can be loaded into the container 12. The hatch opening 51 is large enough to accommodate the passage of a human and is equipped with a suitable conventional hatch cover (not shown) to close and seal the hatch opening 51. The top portion 24 is also provided with a pair of upwardly extending protrusions 52 to form ladder pockets to support the upper ends of an access ladder, as will be described in greater detail below. The bottom portion 23 is preferably formed in a funnel-like configuration so that the material within the container 12 will pass through a discharge opening 53 into a conventional metering device 54 that meters the discharged supply of material to a planting or dispensing implement (not shown).

Referring now to FIGS. 3a through 3d, the details of an interior container 13 can best be seen. The interior container 13 is used in the three container configuration of the tank 11, but would be deleted in the two container configuration. The interior container 13 is configured to mate with both the first and second end containers 12, 14. Accordingly, the interior container has a convex mating wall 30 having a shape that is complimentary to the concave mating wall 25. The convex mating wall 30 has a pair of outwardly protruding lobes 31, 32 that are formed with planar surface segments 33 that register with the planar surface segments 28 of the lobes 26, 27 on the interior mating wall 25 of the first container 12. A convex curved key member 34 does not project outwardly from the container 13 as far as the lobes 31, 32 so that the convex key member 34 will register with the concave key member 29 when the two containers 12, 13 are mounted in the cradle 17. The convex key member 34 forms a recess between the opposing convex lobes 31, 32. The recessed curved surface 34a and the side walls 34b of the convex key member 34 help to strengthen the convex mating wall 30 to permit the interior container 13 to retain material therein without deformation, independently of whether the end containers 12, 14 have material within them.

The opposing face of the interior container 13 is formed in a concave mating wall 35 having opposing lobes 36, 37 formed with planar surface segments 38 in a geodesic-like shape oriented in a generally vertical curve identically to the concave mating wall 25 of the first end container 12. Likewise, the concave mating wall 35 of the interior container 13 has a central key portion 39 that does not extend into the interior of the container 13 as far as the opposing lobes 36, 37 do, thereby forming a complimentary shape to the opposing convex mating wall 30. With the convex mating wall 30 protruding outwardly in substantially the same shape and volume as the concave mating wall 35 extends inwardly into the interior of the container 13, the overall volume of the interior container 13 is substantially the same as if the interior container 13 were made without the lobes 31, 32, 36 and 37.

As with the first end container 12, the interior container 13 has a hatch opening 51 at the top for access into the interior of the container 13 for either material or a human. Also like the first end container 12, the interior container 13 has a ladder 50 supported at the upper end thereof by upwardly extending protrusions 52. The ladder 50 follows along the concave key portion 39 to lend strength thereto. The bottom end of the ladder is mounted into a structure (not shown) that is formed or fixed to the lower portions of the container 13 to receive the ladder 50. The ladder 50 is formed to generally follow the curved surface of the concave key portion 39 to resist buckling forces exerted from extreme pressures exerted onto the concave key portion from the adjacent interlocked container 14. In the absence of the ladder, under extreme pressures, the curved key portion could invert by collapsing inwardly, causing the lobes to buckle inwardly as well. The width of the ladder 50 is preferably approximately the same width as the key portion 39 with the ladder 50 preferably touching the sides of the key portion 39. Tests have shown that the lobes 36, 37 to at times exert pressure on the ladder 50. The curved shape of the key portion 39 serves as a rib to strengthen and stiffen the concave mating wall 35 in addition to the rigidity added by the ladder 50.

Installation of the ladder 50 in all the containers 12–14 is preferably accomplished by lifting the ladder 50 upwardly into the protrusions 52 and dropped down into the receiving structure (not shown) located at bottom of the container 13 to provide a no-bolt removable installation. Pressurization for the container 12–14 is accomplished through one or both of the upright members of the ladder 50 from a connection at the bottom through the receiving structure (not shown) to force air into the container 12–14. The pressurizing air exits the ladder upright members at the upper ends thereof, which has the additional benefit of keeping the material within the container 12–14 from entering the upright members of the ladder 50. The ladder 50 can also be used as a means to vent the container 12–14 in the area of the upward protrusions 52. This use of the ladder 50 to pressurize and vent the container 12–14 eliminates the necessity of providing additional conduits or tubing as is conventional.

Referring now to FIGS. 4a through 4d, the second end container 14 can best be seen. The second end container 14 has an exterior surface and shape similar to that of the first end container 12, including an exterior end wall 41, a pair of opposing exterior side walls 42, a bottom portion 43, and a top portion 44, all formed, preferably, from integrally molded plastic or like material. Opposite the exterior end wall 41 is an interior convex mating wall 45 formed of two geodesic-like lobes 46, 47 separated by a curved key member 49. As described above with respect to the convex mating wall 30 of the interior container 13, the curved key member 49 does not extend into the interior of the container 12 as deeply as the opposing lobes 46, 47. The geodesic-like lobes 46, 47 are formed with a plurality of planar surface segments 48 arranged in the previously described generally vertically curved orientation to form a shape substantially identical to the convex mating wall 30 of the interior container 13.

As with the other containers 12, 13, the top portion 44 is provided with a hatch opening 51 through which material can be loaded into the container 12. The hatch opening 51 is large enough to accommodate the passage of a human and is equipped with a suitable conventional hatch cover (not shown) to close and seal the hatch opening 51. The top portion 44 is also provided with a pair of upwardly extending protrusions 52 to form ladder pockets to support the upper ends of an access ladder, as is described above. The bottom portion 43 is preferably formed in a funnel-like configuration so that the material within the container 12 will pass through a discharge opening 53 into a conventional metering device 54 that meters the discharged supply of material to a planting or dispensing implement (not shown).

The tank 11 is assembled by interlocking the complementary, mating convex and concave lobes and registrable key portions of adjacent containers. In the three compartment configuration for the tank 11, the convex mating wall 30 of the interior container 13 is fit into the concave mating wall 25 of the first end container 12, while the convex mating wall 45 of the second end container 14 is fit into the concave mating wall 35 of the interior container 13 to form a three container tank with interlocking module containers 12 -14. If a two compartment tank 11 is desired, the interior container 13 is eliminated and the convex mating wall 45 of the second end container 14 is fit into the concave mating wall 25 of the first end container 12 to provide an interlocking modular construction. When assembled, the two end containers 12, 14 appear to have the same size, but have different volumes due to the convex mating wall 45 of the second end container 14 ultimately taking volume from the interior of the first end container 12. Preferably the relative volumes of the two containers 12, 14 are in a 60/40 ratio. By changing the configuration of the size and shape of the convex and concave mating walls, the actual ratio of the relative volume between the two containers 12, 14 can be varied as desired without changing the outer dimensions of the tank 11.

As is best seen in FIG. 1, the top portions of the containers 12–14 can be tied together by means of a catwalk frame 55 that encompasses the respective top portions by a metal ring that is preferably tied to the rim around the respective hatch openings 51. An access ladder 57 supported by the frame 15 of the air cart 10 provides convenient access to the catwalk frame 55 and to the hatch openings 51 to the respective containers 12–14. Each container 12–14 is designed to withstand loading on its own without requiring loading in the adjacent container or containers. The geodesic-like shape of the convex and concave lobes coupled with the recessed curved key portion that provides many bends and angles, as opposed to domed surfaces known in the prior art, that provide a stiffer resistance to collapsing, yet allow the convex and concave mating walls to interlock in the completed tank 11 for even greater support. As a result, the tank 11 will be operable with material in any one of the containers without any material being stored in any other of the containers without fear of the utilized container collapsing.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A hopper structure for containing a fluid or product comprising:
   a first molded container having an outer end wall, an opposite inner end including two spaced apart concave portions separated by a key portion defining a predetermined distance between said spaced apart concave portions, and side walls connecting the outer end wall and the opposite inner end;
   a second molded container having an end wall, an opposite inner end including two spaced apart convex portions separated by a predetermined distance, the convex portions being complementary with the concave portions of the first molded container, and side walls connecting the outer end wall and the opposite inner end of said second molded container; and
   a ladder disposed within said first container between said two spaced apart concave portions to provide support to said key portion between said spaced apart concave portions, said ladder including vertical members and horizontal members, at least one of said vertical members serving as a conduit for carrying a fluid into said first container.

2. The hopper of claim 1 wherein said at least one vertical member is coupled to a means for providing a fluid supply.

3. The hopper of claim 2 wherein said fluid is air for pressurizing said first container.

4. A multi-compartment tank for an agricultural implement comprising:
   a first container having a first side formed in a convex configuration to be complementary with a second container having a mating side formed in a concave configuration,
   said first side having a first convex lobe, a second convex lobe, and a generally vertically oriented convex key portion separating said first and second convex lobes, and
   said second side having a first concave lobe complimentary to said first convex lobe, a second concave lobe complimentary with said second convex lobe, and a generally vertically oriented concave key portion registrable with said convex key portion and separating said first and second concave lobes.

5. The multi-compartment tank of claim 4 wherein said convex key portion defines a recess between said first and second convex lobes, such that said first and second convex lobes project outwardly from said first container more than said convex key portion.

6. The multi-compartment tank of claim 5 wherein said convex key portion has a smooth curved surface, each of said convex lobes having a plurality of planar surface segments forming a convex configuration.

7. The multi-compartment tank of claim 6 further comprising:
   a third container having a third and fourth concave lobes with a second generally vertical concave key portion separating said third and fourth concave lobes; and
   said second container including a first wall defining said mating side and having said first and second concave lobes and said concave key portion formed thereon and an opposing second wall formed with third and fourth convex lobes complimentary to said third and fourth concave lobes and with a second convex key portion separating said third and fourth convex lobes, said second convex key portion being complimentary to said second concave key portion.

8. The multi-compartment tank of claim 7 wherein each of said key portions is formed with said smoothly curved surface, each of said lobes being formed with said planar surface segments arranged in a generally curved configuration.

9. The multi-compartment tank of claim 8 wherein said containers are supported by a frame surrounding said containers.

10. The multi-compartment tank of claim 8 wherein said second container is provided with a ladder mounted to said concave key portion to increase stiffness thereof during loading.

11. A multi-compartment tank for an agricultural implement comprising:
    a first container having a first side formed in a convex configuration having a first convex lobe, a second convex lobe, and a generally vertically oriented convex key portion separating said first and second convex lobes; and
    a second container having a mating side formed in a concave configuration complimentary of said first side of said first container to be interlocking therewith, said mating side having a first concave lobe complimentary to said first convex lobe, a second concave lobe complimentary with said second convex lobe, and a generally vertically oriented concave key portion registrable with said convex key portion and separating said first and second concave lobes,
    each of said key portions being formed with a smoothly curved surface, each of said lobes being formed with a plurality of planar surface segments arranged in a generally vertically curved configuration.

12. The multi-compartment tank of claim 11 wherein said first and second convex lobes projecting outwardly from said first container further than said convex key portion such that said convex key portion forms a recess between said first and second convex lobes.

13. The multi-compartment tank of claim 12 further comprising:
    a third container having a third and fourth concave lobes with a second generally vertical concave key portion separating said third and fourth concave lobes; and
    said second container including a first wall defining said mating side and having said first and second concave lobes and said concave key portion formed thereon and an opposing second wall formed with third and fourth convex lobes conmplimentary to said third and fourth concave lobes and with a second convex key portion separating said third and fourth convex lobes, said second convex key portion being complimentary to said second concave key portion.

14. The multi-compartment tank of claim 13 wherein each of said key portions is formed with said smoothly curved surface, each of said lobes being formed with said planar surface segments arranged in a generally curved configuration.

15. The multi-compartment tank of claim 14 wherein each of said second and third containers is provided with a ladder mounted to said concave key portion to increase stiffness thereof during loading.

16. The multi-compartment tank of claim 15 wherein said ladder includes vertical members and horizontal members, at least one of said vertical members serving as a conduit for carrying air into the corresponding said container.

17. The multi-compartment tank of claim 14 wherein said containers are supported by a frame surrounding said containers.

18. A multi-compartment tank for an agricultural implement comprising:

a first molded container having an outer surface and an interior convex mating wall including two spaced apart convex lobes separated by a convex central rib defining a generally vertically curved mating surface;

a second molded container having an outer surface and an interior concave mating wall including two spaced apart concave lobes separated by a concave central rib defining a generally vertically curved mating surface, said concave mating wall being formed to nest with said convex mating wall of said first container; and a ladder disposed within said second container between said concave lobes to be registrable with said concave central rib.

19. The multi-compartment tank of claim 18 wherein said ladder includes vertical members and horizontal members, said vertical members being received within upwardly protruding members formed in an upper surface of said second container to fix said ladder against said concave central rib to provide support thereto to resist inward buckling of said concave mating wall.

20. The multi-compartment tank of claim 19 wherein at least one said vertical member serves as a conduit for carrying a gas into said second container for pressurizing said second container.

* * * * *